United States Patent
Pettersson et al.

(10) Patent No.: US 10,065,253 B2
(45) Date of Patent: Sep. 4, 2018

(54) MILLING INSERT AND A MILLING TOOL

(71) Applicant: SANDVIK INTELECTUAL PROPERTY AB, Sandviken (SE)

(72) Inventors: Sven Pettersson, Valbo (SE); Isak Kakai, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/531,144

(22) PCT Filed: Nov. 9, 2015

(86) PCT No.: PCT/EP2015/076036
§ 371 (c)(1),
(2) Date: May 26, 2017

(87) PCT Pub. No.: WO2016/083106
PCT Pub. Date: Jun. 2, 2016

(65) Prior Publication Data
US 2017/0326657 A1   Nov. 16, 2017

(30) Foreign Application Priority Data
Nov. 28, 2014   (EP) .................................. 14195439

(51) Int. Cl.
*B23C 5/20* (2006.01)
*B23B 27/16* (2006.01)
(Continued)

(52) U.S. Cl.
CPC .............. *B23C 5/109* (2013.01); *B23C 5/207* (2013.01); *B23C 5/22* (2013.01); *B23B 27/16* (2013.01);
(Continued)

(58) Field of Classification Search
CPC ...... B23C 2200/0438; B23C 2200/165; B23C 2200/286; B23C 2200/161;
(Continued)

(56) References Cited

U.S. PATENT DOCUMENTS 7,905,688 B2 *   3/2011   Ertl ........................... B23C 5/10
407/113
8,647,024 B2 *   2/2014   Saji ......................... B23C 5/109
407/34
(Continued)

FOREIGN PATENT DOCUMENTS

EP   2298479 A1   3/2011
EP   2682215 A2   1/2014
(Continued)

*Primary Examiner* — Nicole N Ramos
(74) *Attorney, Agent, or Firm* — Corinne R. Gorski

(57) ABSTRACT

A milling insert suitable for shoulder milling includes a side surface extending between an upper and lower side and a cutting edge having a primary and a secondary cutting edge portion. The side surface includes an axial support surface opposite of the secondary cutting edge portion. The lower side includes a locking groove extending longitudinally, and a lower contact region formed to bear on a fastening member. The upper side has an upper contact region arranged to bear on a top support member of a tool in which the milling insert is mountable. A milling tool is provided with a top support member for bearing on the upper contact region of the milling insert, a locking ridge for locking with the locking groove, and an axial contact surface for supporting the axial support surface. A fastening member presses the milling insert against the top support member and the locking ridge.

18 Claims, 6 Drawing Sheets

(51) Int. Cl.
*B23C 5/10* (2006.01)
*B23C 5/22* (2006.01)

(52) U.S. Cl.
CPC ........ *B23C 5/20* (2013.01); *B23C 2200/0438* (2013.01); *B23C 2200/165* (2013.01); *B23C 2200/286* (2013.01); *B23C 2210/168* (2013.01); *Y10T 407/192* (2015.01)

(58) Field of Classification Search
CPC ... B23C 2210/168; B23C 5/109; B23C 5/207; B23C 5/22; B23C 5/2468; B23C 5/2465; B23C 5/20; B23B 27/14; B23B 27/18; B23B 27/20; B23B 27/16; Y10T 407/23; Y10T 407/2274; Y10T 407/1962; Y10T 407/1936; Y10T 407/1934; Y10T 407/1924
See application file for complete search history.

(56) References Cited

U.S. PATENT DOCUMENTS

| | | | | |
|---|---|---|---|---|
| 2007/0258779 A1* | 11/2007 | Lundvall | ............... | B23B 27/145 407/113 |
| 2008/0166191 A1* | 7/2008 | Andersson | ........... | B23C 5/2208 407/103 |
| 2008/0181731 A1* | 7/2008 | Wallstrom | ............ | B23C 5/2213 407/116 |
| 2009/0169313 A1* | 7/2009 | Satran | ..................... | B23C 5/109 407/40 |
| 2010/0003090 A1* | 1/2010 | Johansson | ............... | B23C 5/202 407/113 |
| 2011/0274506 A1 | 11/2011 | Kakai | | |
| 2011/0305533 A1* | 12/2011 | Kisselbach | ............... | B23C 5/04 407/48 |
| 2012/0051852 A1* | 3/2012 | Choi | .................... | B23C 5/2441 407/44 |
| 2012/0207555 A1* | 8/2012 | Sjoo | ...................... | B23F 21/166 407/114 |
| 2012/0257935 A1* | 10/2012 | Sture | ..................... | B23F 21/166 407/51 |
| 2013/0294851 A1* | 11/2013 | Sagstrom | ............. | B23F 21/128 407/48 |
| 2014/0010606 A1* | 1/2014 | Sagstrom et al. | ........ | B23C 5/08 407/51 |
| 2014/0010607 A1* | 1/2014 | Wandeback | .......... | B23F 21/128 407/113 |

FOREIGN PATENT DOCUMENTS

| | | | | |
|---|---|---|---|---|
| JP | 2000141122 A | * | 5/2000 | ............. B23C 5/207 |
| WO | WO 2008012097 A1 | * | 1/2008 | ............... B23C 5/04 |

* cited by examiner

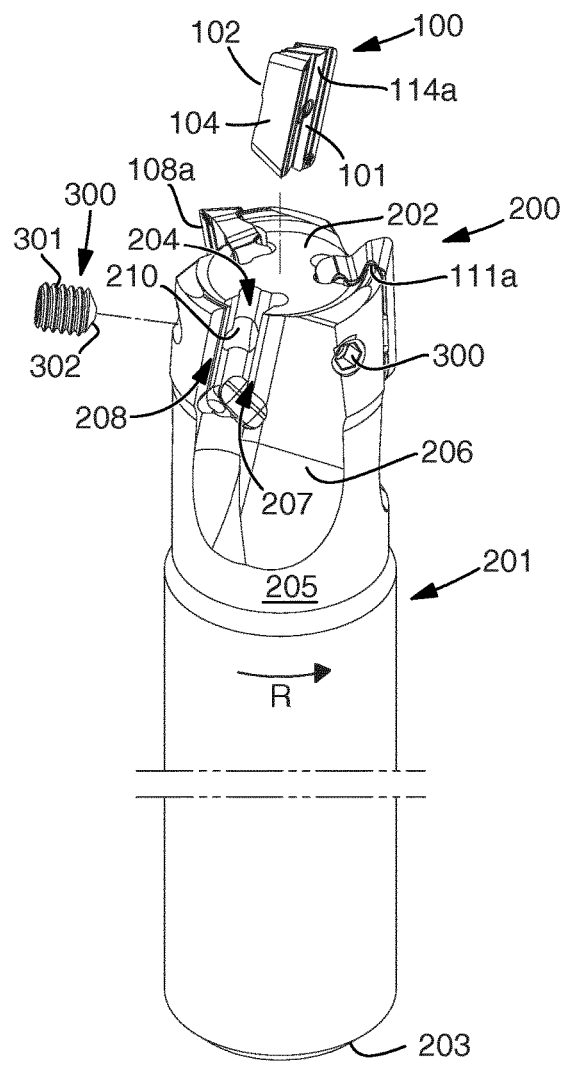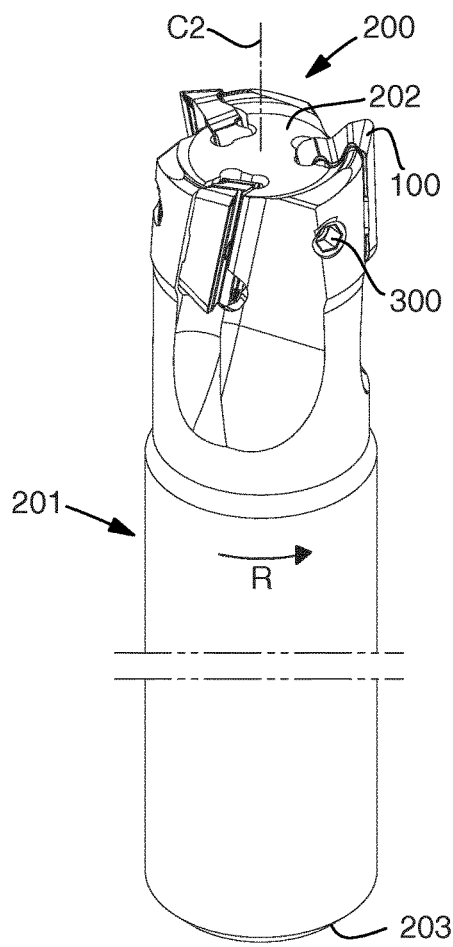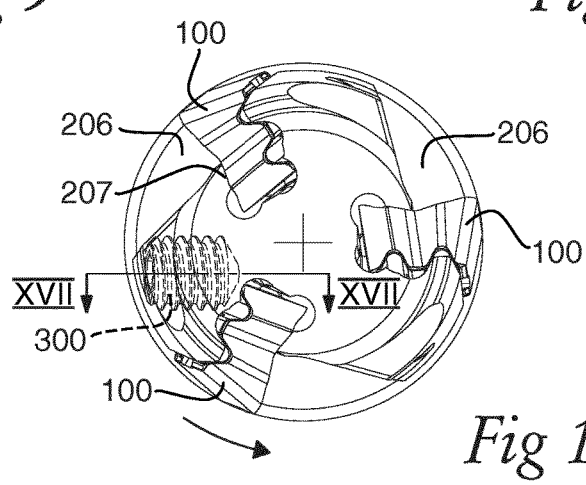
Fig 9
Fig 10
Fig 11

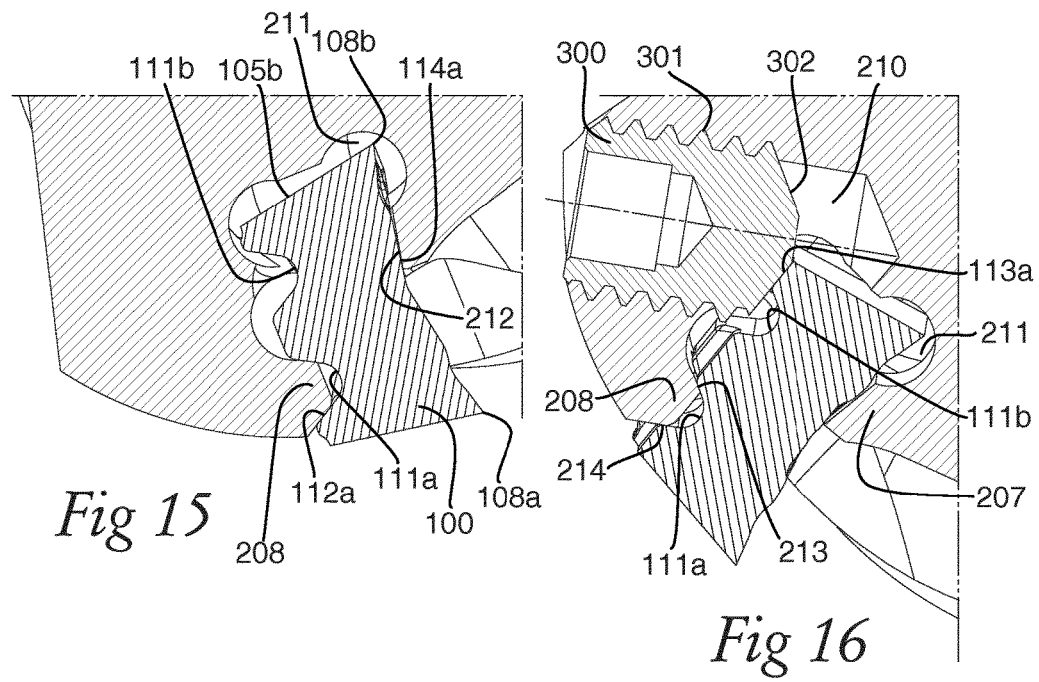
Fig 15
Fig 16
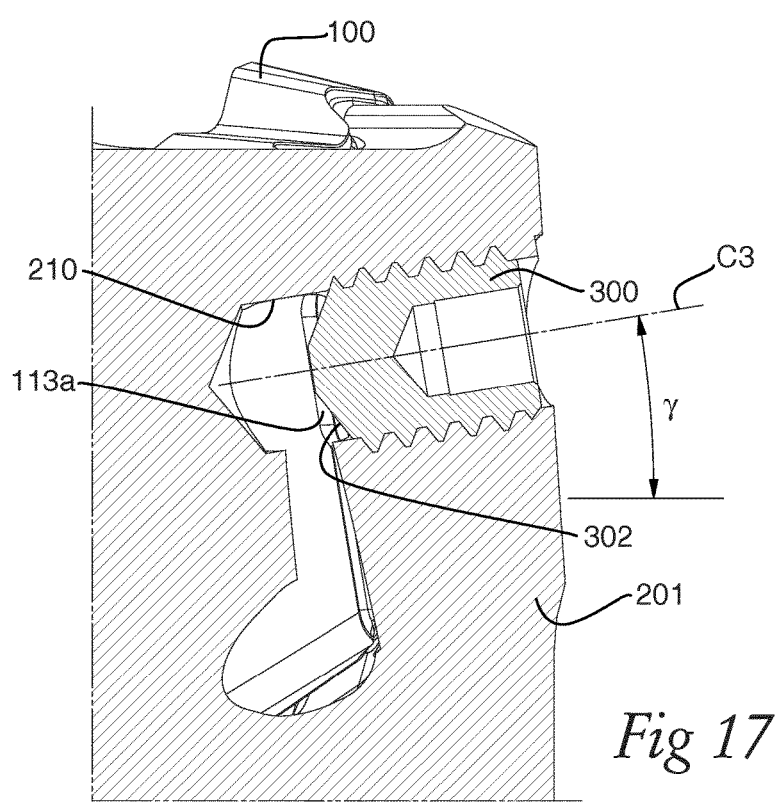
Fig 17

MILLING INSERT AND A MILLING TOOL

RELATED APPLICATION DATA

This application is a § 371 National Stage Application of PCT International Application No. PCT/EP2015/076036 filed Nov. 9, 2015 claiming priority of EP Application No. 14195439.6, filed Nov. 28, 2014.

TECHNICAL FIELD OF THE INVENTION

The present invention relates to a milling insert according to the preamble of claim 1. It further relates to a milling tool according to the preamble of claim 11. In particular, the milling tool and the milling insert are suitable for use in shoulder milling applications.

BACKGROUND OF THE INVENTION AND PRIOR ART

Milling tools for shoulder milling, such as shank-end mills, may advantageously be used for machining of shoulders, grooves and edges. For the machining of small details, it is necessary to use a milling tool having a small diameter. For cost-efficiency, it is preferable to use a milling tool which comprises on one hand a tool body, and on the other hand detachable and replaceable milling inserts. However, the milling inserts are subjected to great forces during the milling operation, acting to displace and turn the milling inserts. It is therefore necessary to rigidly fasten the milling inserts in the tool body. This is most often done by providing the milling insert with a centre hole, by means of which a screw or another male fastening member is used to fasten the milling insert in the tool body. There are however disadvantages associated with this fastening method, in particular for milling tools having a small diameter. For example, the small diameter makes it necessary to use small screws, which are generally difficult to handle and which are easy to drop in the process of mounting the milling insert. It may also be difficult to access the hole in the mounting process. Furthermore, the large centre hole weakens the milling insert and makes it less shape stable after pressing and sintering of the insert.

US 2011/0274506 discloses a milling tool and an indexable milling insert for shoulder milling, or for a shank end milling tool, which aim at overcoming the disadvantages of screw mounting. The milling insert is provided with a lock structure including a locking surface arranged on a secondary clearance surface of the milling insert and a coupling structure arranged on an upper side of the milling insert. The milling insert is secured in the tool body by means of the lock structure without the use of any screws or other fastening members. However, mounting of the milling insert is complicated since special tools are required, and the mounted milling insert is not as stable as a screw mounted milling insert.

SUMMARY OF THE INVENTION

An object of the present invention is therefore to provide a milling insert which is suitable for shoulder milling or shank end milling tools with diameters down to less than 10 mm and which can be easily and efficiently secured in a tool body without compromising stability, and a milling tool using such milling inserts.

This object is, according to a first aspect of the invention, achieved by a milling insert according to claim 1. The milling insert comprises an upper side defining an upper extension plane and including a chip surface, a lower side defining a lower extension plane parallel with the upper extension plane, a side surface extending between the upper side and the lower side around the periphery of the milling insert and including at least one primary clearance surface and at least one secondary clearance surface, and a cutting edge comprising a primary cutting edge portion formed between the primary clearance surface and the chip surface and a secondary cutting edge portion formed between the secondary clearance surface and the chip surface. The upper side has a basic shape of a parallelogram with a base b defining a longitudinal direction along the primary cutting edge portion, and a height h defining a lateral direction perpendicular to the longitudinal direction. A longitudinal mid-plane of the milling insert is defined, extending in the longitudinal direction perpendicularly to the upper extension plane and laterally located at half of the height h. The side surface comprises an axial support surface longitudinally located opposite of the secondary cutting edge portion, and at an angle α, preferably at an acute angle α, with respect to the longitudinal mid-plane as seen in the upper extension plane. The milling insert is characterized in that the lower side comprises a locking groove extending in the longitudinal direction along the entire milling insert outside of said longitudinal mid-plane and having an outermost wall located laterally outside of the axial support surface, that the lower side further comprises a lower contact region formed to bear on a fastening member, which lower contact region is formed laterally inside of the longitudinal mid-plane, and in that the upper side comprises an upper contact region laterally located between the longitudinal mid-plane and the lower contact region, which upper contact region is configured to bear on a top support member of a tool body in which the milling insert is mountable.

The milling insert according to the invention is formed to be mountable in a tool body without the use of a screw or other fastening member extending through the milling insert. The milling insert may therefore be manufactured without through-hole for receiving a fastening member. The milling insert is therefore relatively stable and strong. Hence, it involves fewer shape defects resulting from the manufacturing (pressing and sintering) of the insert and it can be made thin without compromising strength, i.e. the distance between the upper side and the lower side can be made short. The manufacturing of milling inserts involves pressing a powder into the shape (or so called green body) of the insert. A problem with milling inserts having through-holes for receiving a fastening member is that pressing can leave a variation in the density distribution around the through-hole and such unevenly compressed material causes the milling inserts to deform after sintering. A milling insert without the through-hole is on the other hand more uniformly compressed and thereby exhibits fewer shape defects after sintering. It should be mentioned however that the milling insert may be provided with a small through-hole designed for supporting it in a subsequent coating process, such as a physical vapour deposition (PVD) process, yet such small through-holes will not affect the milling insert in a detrimental way as mentioned above. Furthermore, the milling insert can be made relatively small and/or with a relatively long primary cutting edge portion, which may for instance be useful in milling tools having small diameters (such as milling tools having diameters down to approximately 9.5 mm). It is possible to fit 2-3 inserts according to the invention into such small milling tools.

The milling insert according to the invention is mountable in the tool body by means of clamping. Thanks to the locking groove, the axial support surface, the lower contact region formed in the lower side, and the upper contact region formed in the upper side, and the relative placement of these on the milling insert, the milling insert can be securely mounted by means of a fastening member. The fastening member presses on the lower contact region so that the upper contact region is in turn pressed against a top support member provided rotationally ahead of the milling insert in the tool body while the locking groove locks with a locking ridge provided in an insert seat of the tool body, thus locking the milling insert in a radial direction of the tool body. For this purpose, the locking groove should be large enough to provide the necessary radial support. The locking groove will also provide a bottom support for the insert. The pressure from the fastening member also pushes the axial support surface into contact with an axial contact surface provided in the tool body so that the milling insert is secured in the axial direction of the tool body. The milling insert according to the invention is formed to be fully radially supported in the tool body without using the side surface as a radial support surface. This makes it possible to manufacture the tool body such that an empty space or gap is provided inside of the milling insert, which makes the milling insert easy to mount by sliding it axially with its locking groove (extending along the entire milling insert) into the locking ridge of the tool body. In other words, since the locking groove is extending along the entire milling insert, the locking groove also extends through the side surface, i.e. it opens or mouths in the side surface or secondary clearance surface of the milling insert, whereby the locking ridge can enter into the opening of the locking groove via the side surface of the insert.

The milling insert according to the invention will also reduce the distance between the radial support (provided by the locking groove/ridge) and the primary cutting edge, whereby the influence of any possible shape defects from the manufacturing of the insert is furthermore reduced. Hence, the precision in the positioning of the primary cutting edge is thereby enhanced. The locking groove/ridge will furthermore provide a centrifugal support for the insert in high-speed milling (at high rotational speeds).

According to an embodiment of the invention, the lower contact region comprises a recess formed with respect to the lower extension plane. The recess is particularly useful in the case of an indexable milling insert, in which case the lower side is formed with two locking grooves of which one is active at a time. The active recess against which the fastening member is configured to press is formed in the inactive locking groove, and enlarges the contact interface between the milling insert and the fastening member. Deformation of the milling insert and/or the fastening member is thereby prevented and the milling insert can still be securely locked by the fastening member in an axial direction as well as in a radial direction of the tool body in which the milling insert is mounted.

According to an embodiment of the invention, the upper contact region comprises a flat surface extending in the longitudinal direction and laterally inclined at an angle β of 0-45° with respect to the upper extension plane. Thus, the distance between the upper extension plane and the flat surface optionally increases towards the longitudinal mid-plane of the milling insert. In other words, the flat surface declines toward the longitudinal mid-plane when the angle β is greater than zero. In the case of an indexable milling insert comprising two primary and secondary cutting edge portions, the milling insert comprises a flat surface on each side of the longitudinal mid-plane. In this case the distance between the upper extension plane and each of the flat surfaces optionally (i.e. if the angle is greater than zero) will increase in a direction toward the longitudinal mid-plane of the milling insert. In other words, both surfaces are declining toward the longitudinal mid-plane, e.g. in a v-shaped formation. The angle β of 0-45° is chosen so that the milling insert is kept securely in its position.

According to an embodiment of the invention, the upper contact region comprises a convex surface. The convex surface is preferably in the form of a surface which has a uniform distance to the upper extension plane in a longitudinal direction, in which case it is possible to achieve a line contact with a top support member in the tool body. As in the case of a flat surface, a convex surface enables a secure positioning of the milling insert in the tool body. The line contact achieved by the convex surface may even provide a more secure positioning of the milling insert, since a surface area contact is more dependent on the dimensional accuracy of the flat surfaces being in contact with each other. Accordingly, a line contact achieved by a convex surface may be less sensitive to inaccuracies in the manufacturing process and thereby, a more reliable support can be achieved.

According to an embodiment of the invention, the milling insert is shaped so that the base b and the height h of said parallelogram fulfil the relation h<b≤3 h, preferably 1.5 h<b≤3 h. In this embodiment, the milling insert has a relatively long primary cutting edge portion and is suitable for shoulder milling with small diameter tools. The height h is here defined as the distance between two longitudinal lines, each passing through the outermost point of the milling insert at its side of the longitudinal mid-plane. The base b is defined as the maximum cutting depth.

According to an embodiment of the invention, the locking groove has a width w within the range $0.15\ h_L \le w \le 0.40\ h_L$, wherein $h_L$ is the height of the lower side as measured in the lateral direction. The locking groove is thereby dimensioned for an appropriate radial support and bottom support of the milling insert.

According to an embodiment of the invention, a total angle θ measured between the outermost wall and the innermost wall of the locking groove is within the range 50°-100°, preferably within the range 60°-90°, and more preferably within the range 60°-80°. The walls thereby have an inclination configured to provide appropriate radial support and bottom support to the milling insert. The locking groove does no need to be mirror-symmetric, but instead it is possible to have an innermost wall and an outermost wall with different inclinations with respect to the lower extension plane.

According to an embodiment of the invention, the locking groove has a depth d within the range 0.3 w≤d≤0.7 w, wherein w is a width of the locking groove. Sufficient radial support may thereby be provided. A too deep locking groove may weaken the milling insert, and is also more difficult to produce using pressing techniques.

According to an embodiment of the invention, the milling insert is indexable with two opposite primary cutting edge portions and two opposite secondary cutting edge portions. This doubles the tool life of the milling insert with respect to a milling insert comprising a single primary cutting edge portion. In this case, the indexable milling insert is rotationally symmetric with two-fold symmetry and thus comprises two locking grooves of which only one is active at a time. More precisely, the indexable milling insert with two opposite primary and secondary cutting edge portions can be formed with only two locking grooves.

In general, it is enough to only provide as many locking grooves as there are usable primary cutting edge portions. Hence, a milling insert with only one primary and secondary cutting edge portion will only have one locking groove. In any case, the milling insert can be replaced or indexed by sliding it out of or into the insert seat of the tool body. Hence, the locking groove(s) extending along the entire milling insert means that each locking groove extends through, i.e. opens or mouths in the side surface or secondary clearance surface of the milling insert, whereby the locking ridge can enter into the opening of the locking groove via the side surface of the milling insert.

According to an embodiment of the invention, the upper side comprises a chip forming surface. The chip forming surface can be in the form of a ditch running in the longitudinal direction inside the primary cutting edge portion. The chip forming surface prevents chips removed during machining from damaging the upper side of the milling insert. The chip forming surface is therefore particularly advantageous in the case of an indexable milling insert, where the surface which in the first index position is acting as a chip surface inside of the active primary cutting edge, in the second index position is used as the upper contact region. Hence, the chip forming surface is located between the active primary cutting edge and the inactive upper contact region in order to deflect the chips from the inactive upper contact region. Keeping the surface of the inactive upper contact region intact is important to be able to securely lock the milling insert in the tool body in the second index position.

The milling insert according to the invention preferably has a positive basic geometry.

In a second aspect, the invention relates to a milling tool according to claim 11. The milling tool comprises a tool body including a front end and a rear end, between which a central rotation axis extends around which the tool is rotatable in a direction of rotation, and at least one insert seat formed in a transition between the front end and a peripheral surface extending between the front end and the rear end of the tool body, a chip pocket and a top support member being provided rotationally ahead of the at least one insert seat. It further comprises at least one milling insert securely mountable in the at least one insert seat, comprising an upper side defining an upper extension plane and including a chip surface, a lower side, a side surface extending between the upper side and the lower side around the periphery of the milling insert and including at least one primary clearance surface and at least one secondary clearance surface, and a cutting edge comprising a primary cutting edge portion formed between the primary clearance surface and the chip surface and a secondary cutting edge portion formed between the secondary clearance surface and the chip surface. The upper side has a basic shape of a parallelogram with a base defining a longitudinal direction along the primary cutting edge portion, and a height defining a lateral direction perpendicular to the longitudinal direction. A longitudinal mid-plane of the milling insert is defined, extending in the longitudinal direction perpendicularly to the upper extension plane and laterally located at half of the height. The side surface comprises an axial support surface longitudinally located opposite of the secondary cutting edge portion, and at an angle $\alpha$, preferably at an acute angle $\alpha$, with respect to the longitudinal mid-plane as seen in the upper extension plane. The milling tool is characterized in that the lower side of the milling insert comprises at least one first locking member in the form of a locking ridge or a locking groove extending in the longitudinal direction along the entire milling insert outside of said longitudinal mid-plane and having an outermost wall located laterally outside of the axial support surface, that the insert seat comprises a second locking member adapted to engage with the first locking member, that a through-hole having an orifice in the insert seat is provided in the tool body rotationally behind the insert seat, and that the milling tool further comprises a fastening member extending through the through-hole and bearing on a lower contact region provided on the lower side of the milling insert, whereby the fastening member on one hand presses an upper contact region provided on the upper side of the milling insert against the top support member of the tool body so that the second locking member locks with the first locking member and forms a radial support for the milling insert, and on the other hand presses the axial support surface of the milling insert against an axial contact surface provided in the insert seat.

In the milling tool according to the invention, particularly suitable for shoulder milling at an entering angle of 90°, the milling inserts are mounted by a clamping mechanism, in which a separate fastening member such as a screw is used and in which the top support member and the second locking member are integrally formed with the tool body, or possibly in which the second locking member is formed in a shim placed rotationally behind the milling insert. Since the fastening member does not extend through the milling insert but only through the tool body, there is no need to completely remove the fastening member from the tool body when replacing the milling insert. Instead, the fastening member can be slightly retracted with respect to the insert seat so that the milling insert mounted therein may be removed and a new one may be mounted. This saves a lot of trouble in the milling insert mounting procedure for milling tools with small diameters, where small fastening members are needed.

The milling insert is mounted in the tool body by sliding it into its position behind the top support member, resting on the axial contact surface. Thereafter, the fastening member is used to secure the milling insert in this position. The mounting procedure is simple but still, the milling insert can be very accurately positioned thanks to the locking members. When the milling tool is used in a machining process, the cutting forces relieve the fastening member by pressing the first locking member toward the second locking member and thereby keep the milling insert radially secured. Thus, the fastening member may be chosen and dimensioned such that it holds the milling insert when the tool is not in use, but it is not necessary that it is configured to resist the cutting forces.

According to an embodiment of this second aspect of the invention, the lower contact region is provided laterally inside of the longitudinal mid-plane of the milling insert. This ensures that the fastening member levers the milling insert such that it is pressed both against the top support member and the second locking member.

According to an embodiment of the invention, the upper contact region is laterally located between the longitudinal mid-plane and the lower contact region. As in the previous embodiment, this ensures that the fastening member levers the milling insert such that it is pressed both against the top support member and the second locking member.

According to an embodiment of the invention, the milling tool is configured so that the contact interface between the top support member and the upper contact region of the milling insert is in the form of a line contact extending in the longitudinal direction of the milling insert. By arranging the contact interface as a line contact, an overdetermined system is prevented and a secure and precise positioning of the milling insert can be achieved. An interface in the form of a line contact can be achieved by arranging the top support member and the upper contact region as non-parallel planar surfaces that will contact each other along a line, or by making at least one of the surfaces convexly rounded.

According to an embodiment of the invention, the through-hole for receiving the fastening member is formed at an angle γ of 0°-20° with respect to a radial plane perpendicular to the central rotation axis of the tool body. If formed at an angle γ of more than 0°, the angle γ should be such that a central axis of the fastening member and the central rotation axis of the tool body form an acute angle toward the front end of the tool body. In other words, the fastening member is inclined to further push the axial support surface of the insert toward the rear end or axial contact surface of the tool body. In this way, the milling insert can be secured in the axial direction of the tool.

According to an embodiment of the invention, the milling tool is configured so that the contact interface between the fastening member and the lower contact region is in the form of a line contact. In the same way as above, this enables a precise positioning of the milling insert. The line interface may be obtained by providing the fastening member with an end portion having a conical or a truncated conical side surface, and by adjusting the angle of the through-hole such that the end portion of the fastening member contacts the lower contact region along a line parallel with the conical or truncated conical side surface of the end portion.

According to an embodiment of the invention, the first locking member has an innermost wall, and both the outermost wall and the innermost wall are in contact with the second locking member. The milling insert is in this way completely locked in the radial direction of the milling tool.

According to an embodiment of the invention, an empty space is provided in the tool body radially inside of the milling insert and in connection with the insert seat, so that the side surface of the milling insert opposite the primary clearance surface is not in contact with the tool body. This simplifies the mounting procedure of the milling insert since the milling insert is easy to slide into its position resting on the axial contact surface, due to the gap formed between the side surface of the milling insert and the tool body.

BRIEF DESCRIPTION OF THE DRAWINGS

FIG. 9 shows a partially exploded perspective view of a tool according to an embodiment of the invention;
FIG. 10 shows a perspective view of the tool in FIG. 9;
FIG. 11 shows a top view of the tool in FIG. 9;
FIG. 15 shows a cross section along the line XV in FIG. 13;
FIG. 16 shows a cross section along the line XVI in FIG. 14;
and
FIG. 17 shows a cross section along the line XVII in FIG. 11.

DETAILED DESCRIPTION OF EMBODIMENTS OF THE INVENTION

Figure 1:
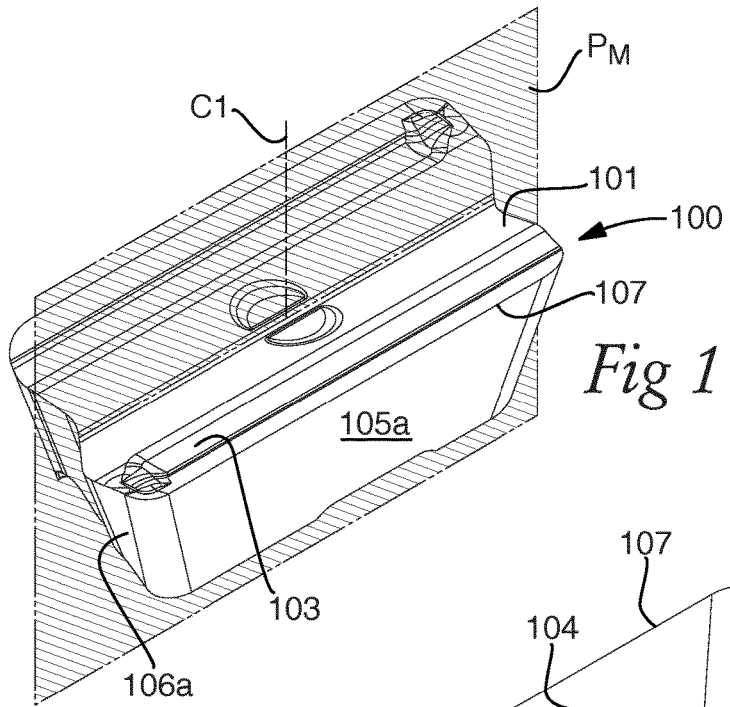
FIG. 1 shows a perspective view of a milling insert according to an embodiment of the invention.
Figure 2:
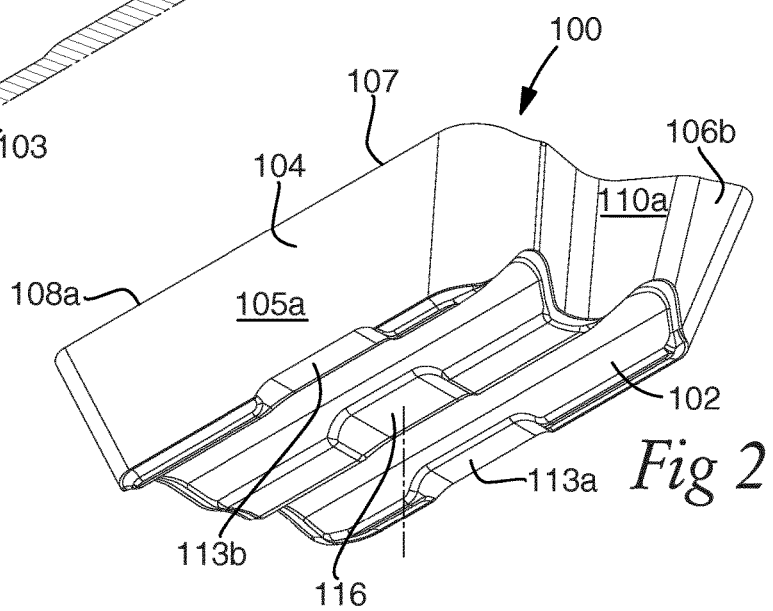
FIG. 2 shows a perspective view of the milling insert in FIG. 1.
Figure 3:
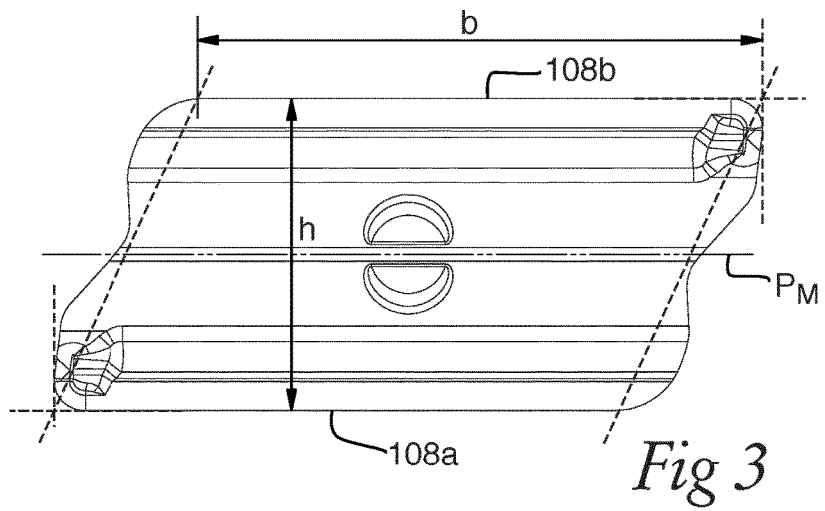
FIG. 3 shows a top view of the milling insert in FIG. 1.

FIGS. 1-8 show a milling insert 100 according to the invention. The milling insert 100 is in the shown embodiment an indexable milling insert adapted for shoulder milling at an entering angle of 90°. The milling insert 100 comprises an upper side 101 and an opposite lower side 102, between which sides a central axis C1 extends. An upper extension plane $P_U$ and a lower extension plane $P_L$ parallel with the upper extension plane $P_U$, defined by the upper side 101 and the lower side 102 respectively, limit the milling insert 100 in the direction of the central axis C1. The upper side 101 includes a chip surface 103. A side surface 104 extends between the upper side 101 and the lower side 102 around the periphery of the milling insert 100 and includes in the shown embodiment two primary clearance surfaces 105a, 105b and two secondary clearance surfaces 106a, 106b. A cutting edge 107 extends around the upper side of the milling insert 100, including two chip removing primary cutting edge portions 108a, 108b, each formed between one of the primary clearance surfaces 105a, 105b and the chip surface 103, and two surface-wiping secondary cutting edge portions 109a, 109b, each formed between one of the secondary clearance surfaces 106a, 106b and the chip surface 103. The milling insert 100 is indexable, so that one primary cutting edge portion 108a and one secondary cutting edge portion 109a are active at a time. In the shown embodiment, the primary cutting edge portions 108a, 108b are parallel, but slight deviations may occur. The upper side 101 has a basic shape of a parallelogram with a base b equal to the maximum cutting depth defining a longitudinal direction along the primary cutting edge portion 108a, 108b, and a height h defining a lateral direction perpendicular to the longitudinal direction. The height h is defined as the distance between two longitudinal lines, each passing through the outermost point of the milling insert 100 at one side of the longitudinal mid-plane $P_M$. In the shown embodiment, since the primary cutting edge portions 108a, 108b are parallel, the height h is equal to the shortest distance between the primary cutting edge portions 108a, 108b. The base b and the height h are both perpendicular to the central axis C1 and the relation between the base b and the height h are here such that b≈1.8 h, but may vary according to the appended claims. A longitudinal mid-plane $P_M$ of the milling insert is defined, extending in the longitudinal direction perpendicularly to the upper extension plane $P_U$ and the lower extension plane $P_L$, and laterally located at half of the height h of the parallelogram.

Figure 4:
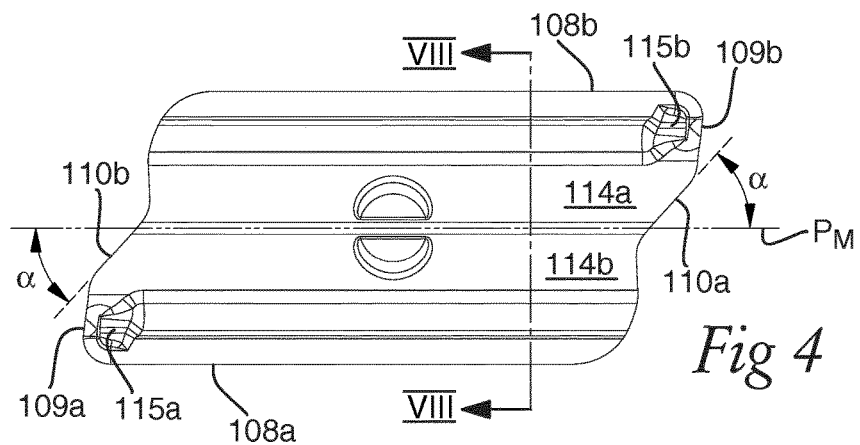
FIG. 4 shows a top view of the milling insert in FIG. 1.
Figure 5:
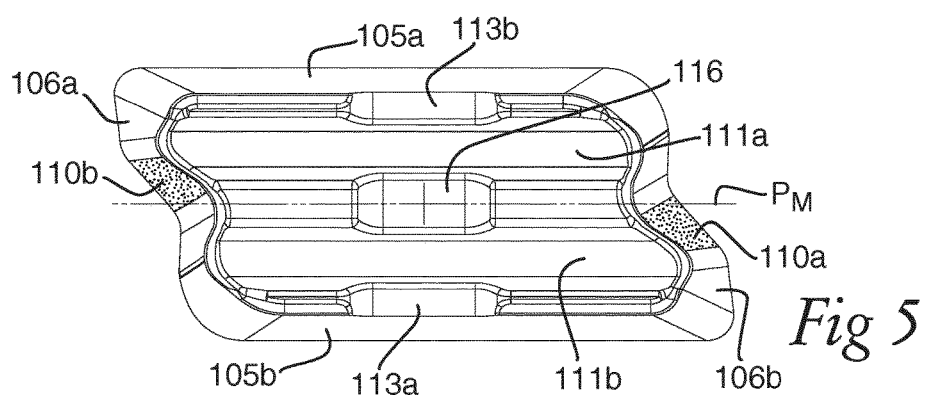
FIG. 5 shows a bottom view of the milling insert in FIG. 1.
Figure 6:
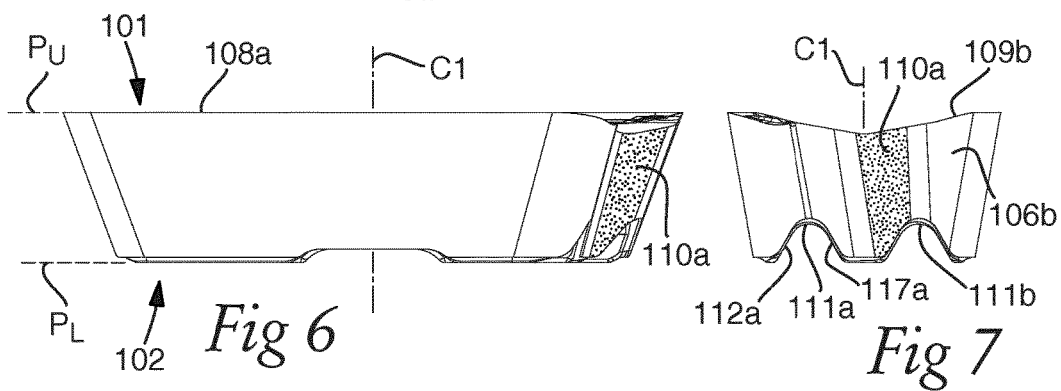
FIG. 6 shows a side view of the milling insert in FIG. 1.
Figure 7:
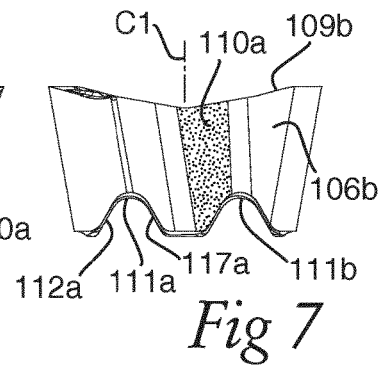
FIG. 7 shows a side view of the milling insert in FIG. 1.

The side surface 104 comprises two axial support surfaces 110a, 110b, configured to be active one at a time. The axial support surfaces 110a, 110b are in FIGS. 5-7 marked with a dotted surface pattern. The active axial support surface 110a is longitudinally located opposite of the active secondary cutting edge 106a. Each of the axial support surfaces 110a, 110b is formed at an external acute angle α with respect to the longitudinal mid-plane $P_M$ as seen in the upper extension plane $P_U$. In other words, in a cross section taken parallel with the upper extension plane $P_U$, a line representing the axial support surface 110a, 110b and a line representing the longitudinal mid-plane $P_M$ forms an external acute angle α as shown in FIG. 4.

The lower side 102 comprises in this embodiment only two locking grooves 111a, 111b, configured to be active one at a time. The locking grooves 111a, 111b extend in the longitudinal direction along the entire milling insert 100. The active locking groove 111a is located laterally outside of the longitudinal mid-plane $P_M$, i.e. at the same side of the longitudinal mid-plane $P_M$ as the active primary cutting edge portion 108a is located. The active locking groove 111a has an outermost wall 112a and an innermost wall 117a, which are both located laterally outside of the active axial support surface 110a. The lower side 102 further comprises two lower contact regions 113a, 113b in the form of recesses with respect to the lower extension plane $P_L$. The lower contact regions 113a, 113b are formed to be active one at a time by bearing on a fastening member 300, as shown in FIGS. 16 and 17. The active lower contact region 113a is located laterally inside of the longitudinal mid-plane $P_M$. In the shown embodiment, the lower side 102 also comprises a central recess 116 formed between the two lower contact regions 113a, 113b.

Figure 8:
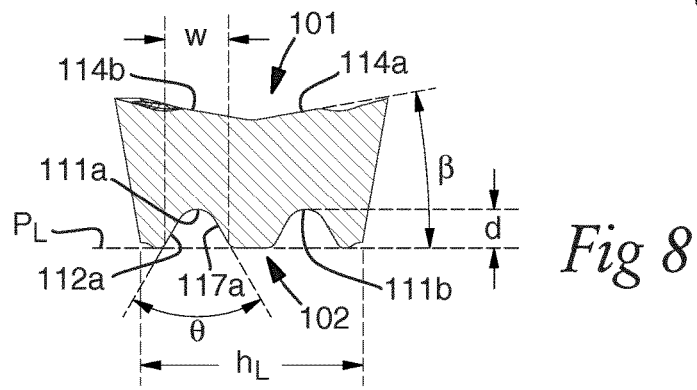
FIG. 8 shows a cross section along the line VIII-VIII in FIG. 4.

The upper side 101 comprises two upper contact regions 114a, 114b, also formed to be active one at a time. The active upper contact region 114a is laterally located between the longitudinal mid-plane $P_M$ and the active lower contact region 113a. The upper contact regions 114a, 114b are each adapted to bear on a top support member 207 of a tool body 201 in which the milling insert 100 is mountable. Each of the upper contact regions 114a, 114b here comprises a flat surface which extends in the longitudinal direction, i.e. along the primary cutting edge portion 108, and which is laterally inclined at an angle β of 10° with respect to the upper extension plane $P_U$ as shown in FIG. 8. In other words, in a cross section taken perpendicular to the longitudinal direction, lines representing the active upper contact region 114a and the upper extension plane $P_U$, or the lower extension plane $P_L$, form an angle β of 10°. The angle β should preferably be in the range 0°-45°. A negative angle β would push the milling insert 100 out of its position in an insert seat 204 of a tool body 201 in which the milling insert is mounted as shown in FIG. 9-17, and with a too large angle β it is difficult to predict the position of the milling insert 100 in the insert seat 204.

The upper side 101 further comprises two chip forming surfaces 115a, 115b in the form of recesses or ditches, each formed inside of a transition between one of the primary cutting edge portions 108a, 108b and one of the secondary cutting edge portions 109a, 109b and running in the entire longitudinal direction inside the primary cutting edge portion 108a, 108b.

FIG. 9-17 show a milling tool 200 for shoulder milling according to the invention. The milling tool 200 comprises a tool body 201 with a cylindrical basic shape. The tool body includes a front end 202 and a rear end 203, between which a central rotation axis C2 extends. The tool 200 is rotatable in a direction of rotation R around the central rotation axis C2. Three insert seats 204 are formed in a transition between the front end 202 and a peripheral surface 205 extending between the front end 202 and the rear end 203. A chip pocket 206 and a top support member 207, formed to abut the upper contact region 114a, 114b of the milling insert 100, are provided rotationally ahead of the at least one insert seat 204. In each insert seat 204, a milling insert 100 as described above is securely mounted (also shown in exploded view in FIG. 9) by means of a fastening member 300 in the form of a screw.

Figure 12A:
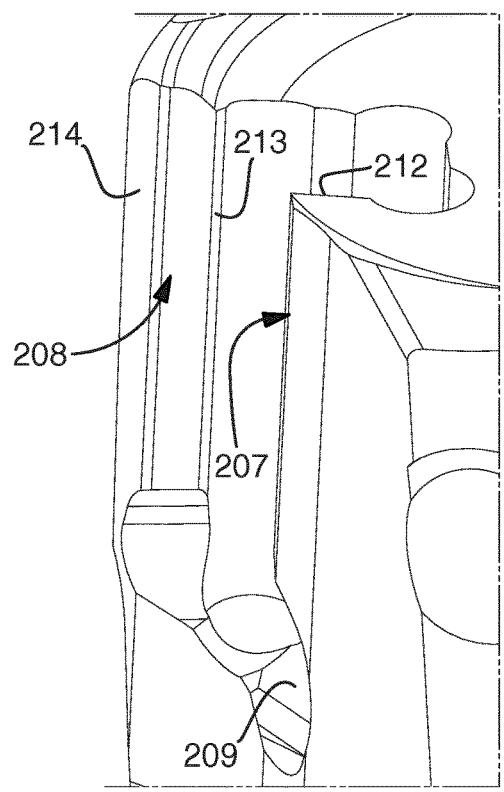
FIG. 12a shows a perspective view of part of the tool in FIG. 9.
Figure 12B:
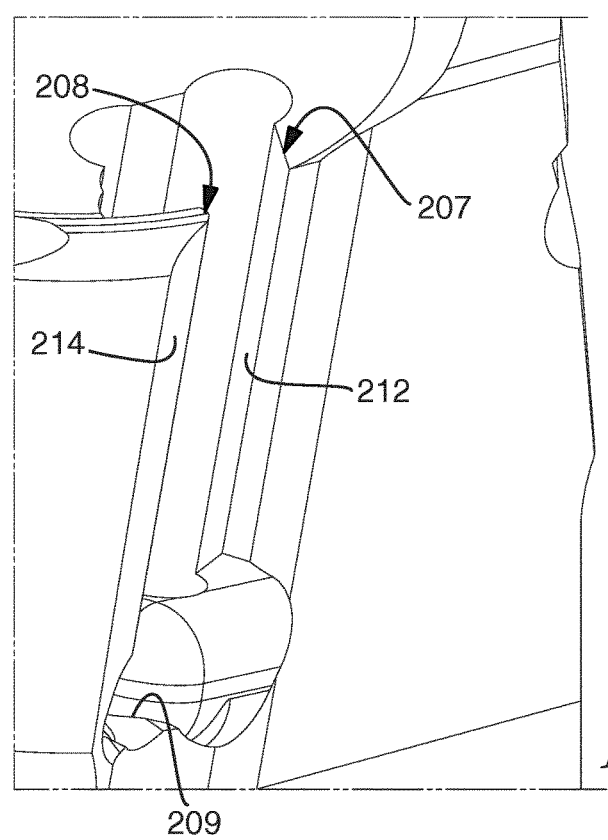
FIG. 12b shows a perspective view of part of the tool in FIG. 9.
Figure 13:
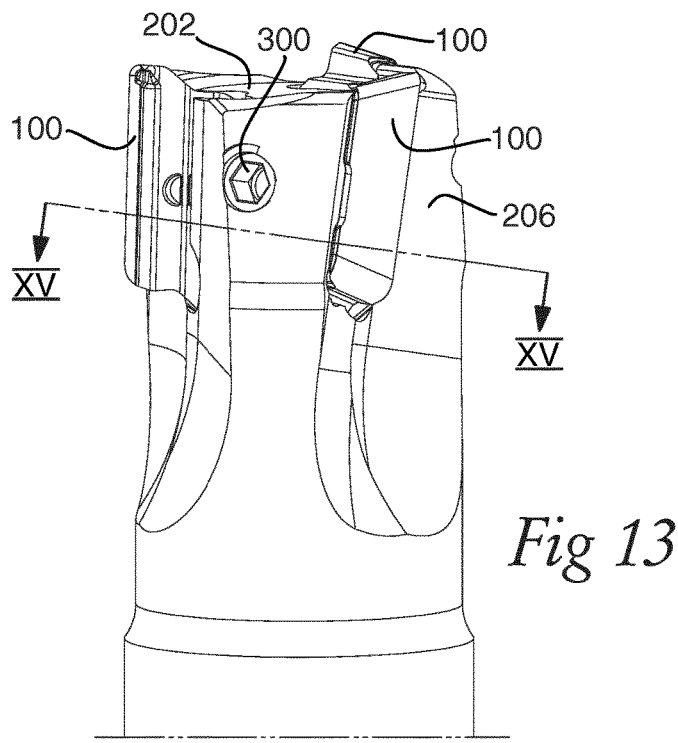
FIG. 13 shows a perspective view of part of the tool in FIG. 9.
Figure 14:
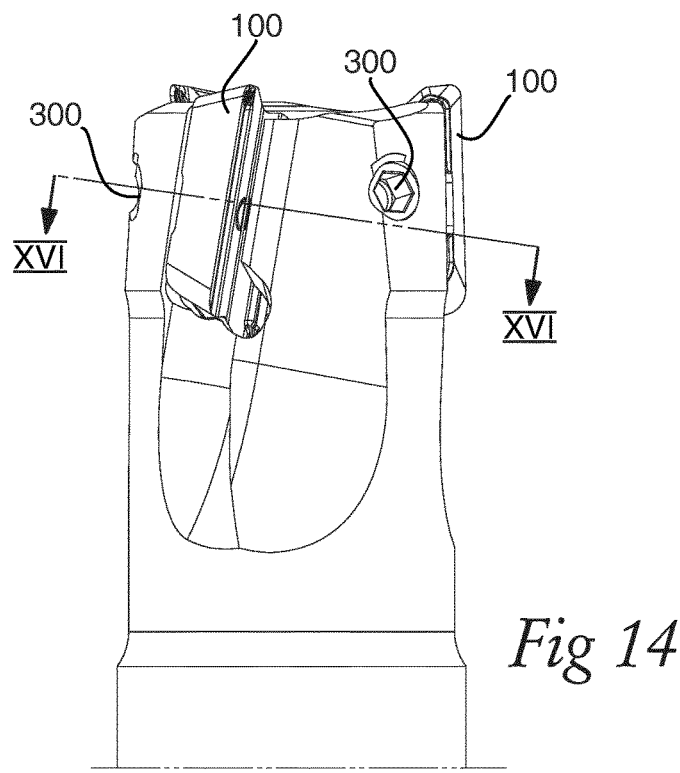
FIG. 14 shows a side view of part of the tool in FIG. 9.

Each insert seat 204 comprises a locking ridge 208 with an inner contact surface 213 and an outer contact surface 214, see FIG. 12a. The locking ridge 208 is adapted to engage with the active locking groove 111a of the milling insert 100. Each insert seat 204 further comprises an axial contact surface 209 formed to engage with the active axial support surface 110a of the milling insert 100.

Radially inside of the milling insert 100 and in connection with the insert seat 204, an empty space 211 is provided in the tool body 201, extending along the inactive primary cutting edge portion 108b of the entire milling insert 100. Thereby, the inactive primary clearance surface 105b of the milling insert 100, and in particular the inactive primary cutting edge portion 108b, are not in contact with the tool body 201.

A threaded through-hole 210 having an orifice in the insert seat 204 and with a central axis C3 is provided in the tool body 201, rotationally behind the insert seat 204. In the shown embodiment, the through-hole 210 is formed so that its central axis C3 is formed at an angle γ of approximately 10° with respect to a radial plane of the tool body 201, i.e. a plane perpendicular to the central rotation axis C2 of the tool body 201. However, the angle γ with which the through-hole 210 is tilted may be varied between 0° and 20°. The through-hole 210 may also be radially tilted, i.e. tilted with respect to a radius of the tool body 201. The angle with which the through-hole is radially tilted is in the shown embodiment approximately 10°, but may vary depending on the diameter of the tool body 201 and the number of insert seats 204.

A fastening member 300 in the form of a screw having a threaded portion 301 and a truncated conical end portion 302 extends through the through-hole 210 and bears on the active lower contact region 113a of the milling insert 100. The fastening member 300 thereby forces the milling insert 100 to turn into a secure position in the insert seat 204, in which the active upper contact region 114a of the milling insert is pressed against a contact surface 212 of the top support member 207 and in which the locking ridge 208 locks with the active locking groove 111a. The locking is achieved by contacting the innermost wall 117a of the locking groove 111a with the inner contact surface 213 of the locking ridge 208 and the outermost wall 112a of the locking groove 111a with the outer contact surface 214 of the locking ridge 208. The locking ridge 208 thereby forms a radial support for the milling insert 100. Due to the empty space 211 provided inside of the milling insert 100, the locking ridge 208 is the only radial support provided. The fastening member 300 also presses the active axial support surface 110a of the milling insert 100 against the axial contact surface 209 provided in the insert seat 204 of the tool body 201 so that the milling insert is secured in the axial direction.

The locking ridge 208 and the locking grooves 111a, 111b should be dimensioned so that an appropriate radial support is achieved. The locking ridge 208 and the locking grooves 111a, 111b should also be dimensioned so that an appropriate bottom support is achieved. Each locking groove 111a, 111b may hereby have a width w of at least 15% of a height $h_L$ of the lower side 102, i.e. the extension of the lower side 102 in the lateral direction as seen in the cross-section in FIG. 8. Each of the two locking grooves 111a, 111b must of course have a smaller width than half of the height $h_L$ of the lower surface 102, so that there is some material left on each side of the locking grooves 111a, 111b (i.e. both between each other and between the outermost wall 112a and the primary clearance surface 105a). For this reason, the width w of each of the two looking grooves 111a, 111b should not exceed 40% of the extension of the lower side 102 in the lateral direction. Preferably, the width w of each of the locking grooves 111a, 111b should be within a range of 15% to 40%, preferably 20% to 40% of the total height $h_L$ of the lower side 102, and in this specific embodiment the width amounts to 31%.

As also seen in the cross-section in FIG. 8, each of the locking grooves 111a, 111b exhibits a depth d (i.e. in a direction perpendicular to the width w of the locking groove 111a, 111b), which is smaller than its width w. The depth d of the locking groove 111a, 111b equals in this embodiment half of the width w in order to provide appropriate radial support. The depth d of the locking grooves 111a, 111b is furthermore somewhat larger than a height of the locking ridge 208 to provide some clearance between the top of the locking ridge 208 and the bottom of the active locking groove 111a. The locking grooves 111a, 111b should however not be made too deep, since this tends to weaken the milling insert 100.

It should furthermore be noted that both the innermost wall 117a and the outermost wall 112a of the locking groove are inclined (i.e. converge) toward the bottom of the locking groove 111a. In this specific case, the two walls 112a, 117a of the locking groove 111a are mirror-symmetric and inclined at 60° in relation to the lower extension plane $P_L$. However, the locking groove 111a may exhibit asymmetrical walls 112a, 117a in which the outermost wall 112a is preferably inclined at a larger angle than the innermost wall 117a. It is the outermost wall 112a that provides the radial support for the milling insert 100. The walls 112a, 117a should also provide an appropriate bottom support to the milling insert 100. The total angle θ measured between the outermost wall 112a and the innermost wall 117a may preferably not exceed 100°. Hence, if the outermost wall 112a is inclined at for instance 50°, the innermost wall 117a may be inclined at 30° or more in an asymmetric form of the locking groove 111a. The total angle θ can take on a value within a range of 50°-100° to provide appropriate radial and bottom support. In a symmetric form of the locking groove 111a, 111b, it is preferable if the total angle θ is within a range of 60°-90° or more preferably within a range of 60°-80°. In the shown embodiment, θ=60°. The walls 112a, 117a are hereby suitably inclined in such a way as to provide optimal bottom and radial support for the milling insert 100. Yet it should also be possible to tilt the active locking groove 111a somewhat around the locking ridge 208 when clamping/fastening the milling insert with the fastening member 300. The innermost wall 117a and the outermost wall 112a do not need to be planar, but could be slightly rounded. In that case, it is preferable if a chord of the innermost wall and a cord of the outermost wall fulfil the angular relationships discussed above.

The locking ridge 208 of the milling tool 200 should be shaped to fit into the active locking groove 111a. For this purpose, the locking ridge could have walls with a similar inclination as the innermost wall 117a and the outermost wall 112a. However, a clearance should be provided at the bottom of the active locking groove 111a, which means that the locking ridge 208 should be dimensioned to provide such a clearance.

In order to secure a milling insert 100 in the tool body 201, the milling insert 100 is slid into the insert seat 204, with the active locking groove 111a engaging with the locking ridge 208, whereby the active axial support surface 110a comes into contact with the axial contact surface 209. In order to secure the milling insert in the insert seat 204, the fastening member 300 is screwed into the through-hole 210 such that the truncated conical surface of the end portion 302 comes into contact with the active lower contact region 113a of the milling insert 100. In the shown embodiment, the truncated conical surface of the end portion 302 will contact the active lower contact region 113a along a line, i.e. the contact interface is in the form of a line contact as shown in FIG. 16. The central recess 116 provided on the lower side 102 of the milling insert 100 provides clearance between the fastening member 300 and the lower side 102 so that the only contact between the fastening member 300 and the milling insert 100 is along the line contact. Preferably, the milling tool 200 should be configured such that an angle between the central axis C3 of the fastening member 300 and the line contact is in an interval between 50 and 75°.

During a milling operation using the milling tool 200, the cutting forces act to further press the milling insert 100 into the insert seat 204. The fastening member 300 therefore does not need to be dimensioned to resist the cutting forces, but only to hold the milling insert 100 in place when the milling tool 200 is in rest.

The invention is not limited to the embodiments disclosed but may be varied and modified within the scope of the appended claims. For instance, the milling insert does not need to be indexable, but may also be a milling insert comprising a single primary cutting edge portion. In this case, the milling insert only needs to comprise one lower contact region, one upper contact region, one axial support surface and one locking groove.

The primary cutting edge portion of the milling insert may, instead of being a straight edge portion as in the shown embodiment, be curved. In particular, the primary cutting edge portion may be slightly convex as seen in the upper extension plane $P_U$. The primary cutting edge portion still runs essentially parallel to the longitudinal direction, but slight deviations from the parallel design may occur.

The at least one lower contact region of the milling insert does not need to be in the form of a recess. Instead, the lower contact region can be in the form of a flat surface against which the fastening member is configured to press. In particular, this may be the case when the milling insert is not an indexable milling insert, so that the lower side is formed with only one locking groove located laterally outside of the longitudinal mid-plane. In this case, it is possible to achieve a large enough contact interface between the milling insert and the fastening member without forming a recess.

The upper contact region of the milling insert and the top support member of the tool body may have different configurations, as long as a stable support is formed, preferably in the form of a line contact between the top support member and the upper contact region. Line contact is desired to achieve an initial predetermined contact line between the top support member of the tool body and the upper contact region of the milling insert. However, due to the elasticity of the tool body, which is typically made of steel, it will in fact yield a surface contact between the top support member and the upper contact region when the contact region is pushed up against the support member with increased force.

It is not necessary that the fastening member is in the form of a screw. It may also be e.g. a tension rod, such as a spring loaded rod, or a wedge type member, or any other suitable fastening member known in the art.

LIST OF REFERENCE SIGNS 100 milling insert
101 upper side
102 lower side
103 chip surface
104 side surface
105a, b primary clearance surface
106a, b secondary clearance surface
107 cutting edge
108a, b primary cutting edge portion
109a, b secondary cutting edge portion
110a, b axial support surface
111a, b locking groove
112a outermost wall
113a, b lower contact region
114a, b upper contact region
115a, b chip forming surface
116 central recess
117a innermost wall
200 milling tool
201 tool body
202 front end
203 rear end
204 insert seat
205 peripheral surface
206 chip pocket
207 top support member
208 locking ridge
209 axial contact surface
210 through-hole
211 empty space
212 contact surface
213 inner contact surface
214 outer contact surface
300 fastening member
301 threaded portion
302 end portion
$P_U$ upper extension plane
$P_L$ lower extension plane
$P_M$ longitudinal mid-plane
C1 central axis
C2 central rotation axis
C3 central axis
R direction of rotation
b base
h height
$h_L$ height
d depth
α angle
β angle
γ angle
θ angle

The invention claimed is:

1. A milling insert, comprising:
    an upper side defining an upper extension plane and including a chip surface;
    a lower side defining a lower extension plane parallel with the upper extension plane;
    a side surface extending between the upper side and the lower side around a periphery of the milling insert and including at least one primary clearance surface and at least one secondary clearance surface;
    a cutting edge including a primary cutting edge portion formed between the primary clearance surface and the chip surface, and a secondary cutting edge portion formed between the secondary clearance surface and the chip surface, wherein the upper side has a basic shape of a parallelogram with a base b defining a longitudinal direction along the primary cutting edge portion, and a height h defining a lateral direction perpendicular to the longitudinal direction, wherein a longitudinal mid-plane of the milling insert is defined, extending in the longitudinal direction perpendicularly to the upper extension plane and laterally located at half of the height h, the side surface including an axial support surface longitudinally located opposite of the secondary cutting edge portion, and at an acute angle α with respect to the longitudinal mid-plane as seen in the upper extension plane, the lower side including a locking groove extending in the longitudinal direction along the entire milling insert outside of said longitudinal mid-plane and having an outermost wall located laterally outside of the axial support surface, the lower side further having a lower contact region formed to bear on a fastening member, which lower contact region being formed laterally inside of the longitudinal mid-plane, and the upper side including an upper contact region laterally located between the longitudinal mid-plane and the lower contact region, which upper contact region being configured to bear on a top support member of a tool body in which the milling insert is mountable.

2. The milling insert according to claim 1, wherein the lower contact region includes a recess formed with respect to the lower extension plane.

3. The milling insert according to claim 1, wherein the upper contact region includes a flat surface extending in the longitudinal direction and laterally inclined at an angle β of 0-45° with respect to the upper extension plane.

4. The milling insert according to claim 1, wherein the upper contact region includes a convex surface.

5. The milling insert according to claim 1, wherein the milling insert is shaped so that the base b and the height h of said parallelogram fulfill the relation h<b≤3 h.

6. The milling insert according to claim 1, wherein the locking groove has a width w within the range 0.15 hL≤w≤0.40 hL, wherein hL is the height of the lower side as measured in the lateral direction.

7. The milling insert according to claim 1, wherein a total angle θ measured between the outermost wall and the innermost wall of the locking groove is within the range 50°-100°.

8. The milling insert according to claim 1, wherein the locking groove has a depth d within the range 0.3 w≤d≤0.7 w, wherein w is a width of the locking groove.

9. The milling insert according to claim 1, wherein the milling insert is indexable with two opposite primary cutting edge portions and two opposite secondary cutting edge portions.

10. The milling insert according to claim 1, wherein the upper side includes a chip forming surface.

11. A milling tool comprising:
    a tool body including a front end and a rear end, between which a central rotation axis extends around which the tool is rotatable in a direction of rotation, at least one insert seat formed in a transition between the front end and a peripheral surface extending between the front end and the rear end of the tool body, a chip pocket and a top support member provided rotationally ahead of the at least one insert seat;

at least one milling insert securely mounted in the at least one insert seat, the milling insert including an upper side defining an upper extension plane and including a chip surface, a lower side, a side surface extending between the upper side and the lower side around a periphery of the milling insert and including at least one primary clearance surface and at least one secondary clearance surface, a cutting edge including a primary cutting edge portion formed between the primary clearance surface and the chip surface, and a secondary cutting edge portion formed between the secondary clearance surface and the chip surface, wherein the upper side has a basic shape of a parallelogram with a base defining a longitudinal direction along the primary cutting edge portion, and a height defining a lateral direction perpendicular to the longitudinal direction, wherein a longitudinal mid-plane of the milling insert is defined, extending in the longitudinal direction perpendicularly to the upper extension plane and laterally located at half of the height (h), wherein the side surface includes an axial support surface longitudinally located opposite of the secondary cutting edge portion, and at an acute angle, with respect to the longitudinal mid-plane as seen in the upper extension plane, the lower side of the milling insert including at least one first locking member being a locking ridge or a locking groove extending in the longitudinal direction along the entire milling insert outside of said longitudinal mid-plane and having an outermost wall located laterally outside of the axial support surface, the insert seat including a second locking member arranged to engage with the first locking member and a through-hole having an orifice in the insert seat provided in the tool body rotationally behind the insert seat; and a fastening member extending through the through-hole and bearing on a lower contact region provided on the lower side of the milling insert, whereby the fastening member presses an upper contact region provided on the upper side of the milling insert against the top support member of the tool body so that the second locking member locks with the first locking member and forms a radial support for the milling insert, and also presses the axial support surface of the milling insert against an axial contact surface provided in the insert seat.

12. The milling tool according to claim 11, wherein the lower contact region is provided laterally inside of the longitudinal mid-plane of the milling insert.

13. The milling tool according to claim 12, wherein the upper contact region is laterally located between the longitudinal mid-plane and the lower contact region.

14. The milling tool according to claim 11, wherein the milling tool is configured so that a contact interface between the top support member and the upper contact region of the milling insert is in the form of a line contact extending in the longitudinal direction of the milling insert.

15. The milling tool according to claim 11, wherein the through-hole for receiving the fastening member is formed at an angle $\gamma$ of 0°-20° with respect to a radial plane perpendicular to the central rotation axis of the tool body.

16. The milling tool according to claim 11, wherein the milling tool is configured so that a contact interface between the fastening member and the lower contact region is in the form of a line contact.

17. The milling tool according to claim 11, wherein the first locking member has an innermost wall, and wherein both the outermost wall and the innermost wall are in contact with the second locking member.

18. The milling tool according to claim 11, wherein an empty space is provided in the tool body radially inside of the milling insert and in connection with the insert seat, so that the side surface of the milling insert opposite the primary clearance surface is not in contact with the tool body.

* * * * *